United States Patent
Taherzadeh Boroujeni et al.

(10) Patent No.: US 11,516,838 B2
(45) Date of Patent: Nov. 29, 2022

(54) SYSTEMS AND METHODS FOR PHYSICAL UPLINK SHARED CHANNEL REPETITION ADAPTATION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 17/124,392

(22) Filed: Dec. 16, 2020

(65) Prior Publication Data

US 2021/0195630 A1 Jun. 24, 2021

Related U.S. Application Data

(60) Provisional application No. 62/951,910, filed on Dec. 20, 2019.

(51) Int. Cl.
*H04W 72/04* (2009.01)
*H04W 72/14* (2009.01)
(Continued)

(52) U.S. Cl.
CPC .......... *H04W 72/14* (2013.01); *H04W 28/06* (2013.01); *H04W 72/042* (2013.01);
(Continued)

(58) Field of Classification Search
CPC .......... H04W 72/042; H04W 72/0446; H04W 72/1268; H04W 72/14; H04W 72/1247;
(Continued)

(56) References Cited

U.S. PATENT DOCUMENTS 9,729,295 B2 * 8/2017 Zhang .................. H04L 1/1861
10,666,334 B2 5/2020 Xiong et al.
(Continued)

OTHER PUBLICATIONS

Huawei, et al., "PUSCH Enhancements for URLLC", 3GPP TSG RAN WG1 Meeting #96, 3GPP Draft; R1-1901559, 3rd Generation Partnership Project (3GPP), Mobile Competence Centre; 650, Route Des Lucioles; F-06921, Sophia-Antipolis Cedex; France, vol. RAN WG1, No. Athens, Greece, Feb. 25, 2019-Mar. 1, 2019, Feb. 16, 2019 (Feb. 16, 2019), XP051599256, 13 Pages, Retrieved from the Internet: URL: http://www.3gpp.org/ftp/tsg%5Fran/WG1%5FRL1/TSGR1%5F96/Docs/R1%2D1901559%2Ezip [retrieved on Feb. 16, 2019] Section 3.1; p. 9-p. 10.
(Continued)

*Primary Examiner* — Wei Zhao
(74) *Attorney, Agent, or Firm* — Qualcomm Incorporated

(57) ABSTRACT

Wireless communications systems and methods are provided relating to a physical uplink shared channel (PUSCH) repetition adaptation scheme when one or more PUSCH repetitions are discarded due to collisions. Specifically, a user equipment (UE) may obtain data for uplink transmission over a plurality of repeated PUSCH instances. In response to determining that at least one repeated PUSCH instance collides with one or more downlink symbol transmissions, the UE may discard the at least one repeated PUSCH instance. The UE may then retransmit data that was scheduled to be transmitted over the at least one repeated PUSCH instance over configured resource that was configured for uplink transmission with configured grants.

30 Claims, 9 Drawing Sheets

(51) Int. Cl.
  *H04W 28/06* (2009.01)
  *H04W 76/27* (2018.01)
  *H04W 72/12* (2009.01)
(52) U.S. Cl.
  CPC ... *H04W 72/0446* (2013.01); *H04W 72/1268* (2013.01); *H04W 76/27* (2018.02)
(58) Field of Classification Search
  CPC . H04W 72/1284; H04W 76/27; H04W 28/06; H04L 1/1887; H04L 1/189
  See application file for complete search history.

(56) References Cited

U.S. PATENT DOCUMENTS

| | | | |
|---|---|---|---|
| 2013/0294318 A1 | 11/2013 | Amerga et al. | |
| 2017/0331670 A1* | 11/2017 | Parkvall | H04B 7/0617 |
| 2021/0051672 A1* | 2/2021 | Rastegardoost | H04W 72/0493 |

OTHER PUBLICATIONS

International Search Report and Written Opinion—PCT/US2020/065703—ISA/EPO—dated Mar. 23, 2021.

Mediatek Inc: "On Repetition Schemes for NR PUSCH", 3GPP TSG RAN WG1 Meeting #98bis, 3GPP Draft: R1-1911080 On Repetition Schemes for NR PUSCH, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 20, 2019, Oct. 8, 2019 (Oct. 8, 2019), XP051809276, 4 Pages, Retrieved from the Internet: URL: https://ftp.3gpp.org/tsg_ran/WG1_RL1/TSGR1_98b/Docs/R1-1911080.zip R1-1911080 On repetition schemes for NR PUSCH.docx [retrieved on Oct. 8, 2019] Section 'interpretation of L and K'; p. 2-p. 3.

Sony: "Considerations on UL Intra-UE Tx Multiplexing", 3GPP TSG RAN WG1 #96, 3GPP Draft, R1-1902182—REL-16 URLLC—Intra-UE MUX V00, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 16, 2019 (Feb. 16, 2019), XP051599877, 9 Pages, Retrieved from the Internet: URL: http://www.3gpp.org/ftp/tsg%5Fran/WG1%5FRL1/TSGR1%5F96/Docs/R1%2D1902182%2Ezip [retrieved on Feb. 16, 2019] Proposal 16, p. 7-p. 7.

* cited by examiner

SYSTEMS AND METHODS FOR PHYSICAL UPLINK SHARED CHANNEL REPETITION ADAPTATION

CROSS-REFERENCE(S)

The application is a nonprovisional of and claims priority under 35 U.S.C. 119 to commonly-owned and U.S. provisional application No. 62/951,910, filed Dec. 20, 2019, which is hereby expressly incorporated by reference herein in its entirety.

TECHNICAL FIELD

The application technology discussed below relates to wireless communication systems, and more particularly to physical uplink shared channel (PUSCH) repetition adaptation when the PUSCH repetition collides with one or more downlink symbols.

Introduction

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

In a wireless system, uplink transmission from one or more UEs to the BS may include configured grant transmission and/or dynamic grants. For example, multiple UEs are allowed to periodic resources for data transmission using the configured grant. The BS allocates the configured grant instances to multiple UEs, and the UEs may randomly utilize the instances when each of them has data to transmit. Specifically, in the next generation new radio (NR) networks, PUSCH repetition is adopted, e.g., with a series of repeated PUSCH instances, as a method to increase the coverage of PUSCH which carries uplink data. However, the extended coverage of PUSCH may sometimes cause the time resources assigned for a PUSCH repetition to collide with time resources assigned for one or multiple downlink symbols. When the collision occurs, the particular PUSCH repetition is usually discarded, which may result in performance loss in coverage. Some existing systems may configure another PUSCH repetition to compensate for the discarded PUSCH, but usually with a significant delay.

Therefore, there is a need for an efficient PUSCH repetition adaptation scheme when the PUSCH repetition collides with one or more downlink symbols.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes obtaining, at a user equipment (UE), data for uplink transmission over a plurality of repeated physical uplink shared channel (PUSCH) instances. The method further includes determining that at least one repeated PUSCH instance collides with one or more downlink symbol transmissions and discarding the at least one repeated PUSCH instance. The method further includes retransmitting data that was scheduled to be transmitted over the at least one repeated PUSCH instance over configured resource that was configured for uplink transmission with configured grants.

In another aspect of the disclosure, a user equipment (UE) of wireless communication is provided. The UE includes a memory configured to obtain data for uplink transmission over a plurality of repeated physical uplink shared channel (PUSCH) instances. The UE further includes a processor configured to: determine that at least one repeated PUSCH instance collides with one or more downlink symbol transmissions and discard the at least one repeated PUSCH instance. The UE further includes a transceiver configured to retransmit data that was scheduled to be transmitted over the at least one repeated PUSCH instance over configured resource that was configured for uplink transmission with configured grants.

In another aspect of the disclosure, a processor-readable non-transitory storage medium storing processor-executable instructions for wireless communication is disclosed. The instructions are executed by a processor to perform operations comprising obtaining, at a user equipment (UE), data for uplink transmission over a plurality of repeated physical uplink shared channel (PUSCH) instances. The operations further comprise determining that at least one repeated PUSCH instance collides with one or more downlink symbol transmissions. The operations further comprise discarding the at least one repeated PUSCH instance, and retransmitting data that was scheduled to be transmitted over the at least one repeated PUSCH instance over configured resource that was configured for uplink transmission with configured grants.

In another aspect of the disclosure, a system of wireless communication is disclosed. The system includes means for obtaining, at a user equipment (UE), data for uplink transmission over a plurality of repeated physical uplink shared channel (PUSCH) instances. The system further includes means for determining that at least one repeated PUSCH instance collides with one or more downlink symbol transmissions and means for discarding the at least one repeated PUSCH instance. The system further includes means for retransmitting data that was scheduled to be transmitted over the at least one repeated PUSCH instance over configured resource that was configured for uplink transmission with configured grants.

Other aspects, features, and aspects of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
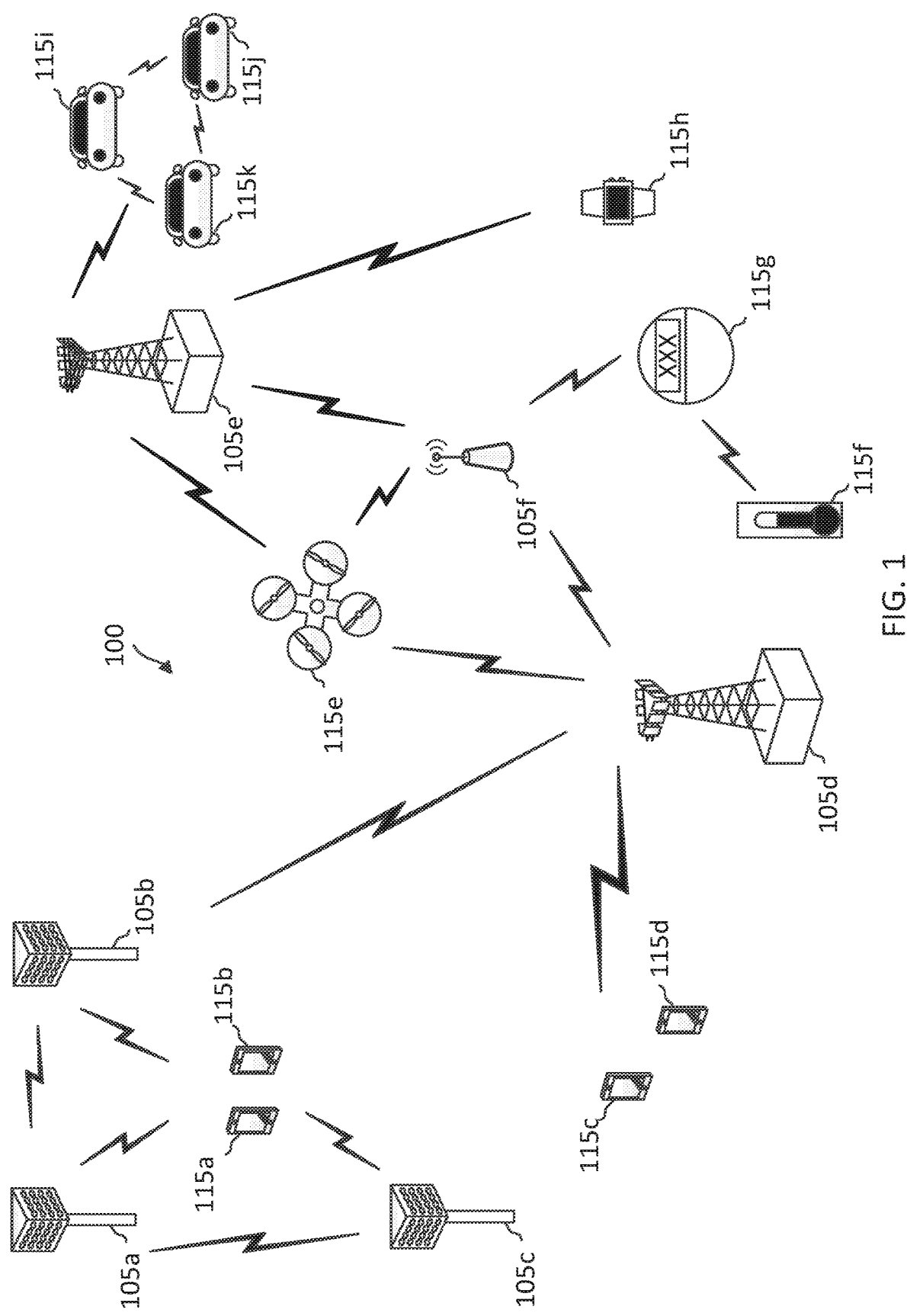
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

The BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some instances, the BS 105 may communicate data with the UE 115 using hybrid automatic request (HARQ) to improve communication reliability. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the component carrier to a UE 115 for UL and DL communications. For example, the BWP pair may include one BWP for UL communications and one BWP for DL communications. The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information (e.g., UL and/or DL scheduling grants) from the BS. In an example, the BS 105 may configure the UE 115 with the BWPs, the CORESETS, and/or the PDCCH search spaces via RRC configurations.

In some aspects, the network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP). The BS 105 or the UE 115 may perform an LBT in the frequency band prior to transmitting in the frequency band. The LBT can be based on energy detection or signal detection. For energy detection, the BS 105 or the UE 115 may determine that the channel is busy or occupied when a signal energy measured from the channel is greater than a certain signal energy threshold. For signal detection, the BS 105 or the UE 115 may determine that the channel is busy or occupied when a certain reservation signal (e.g., a preamble signal sequence) is detected in the channel.

Figure 2:
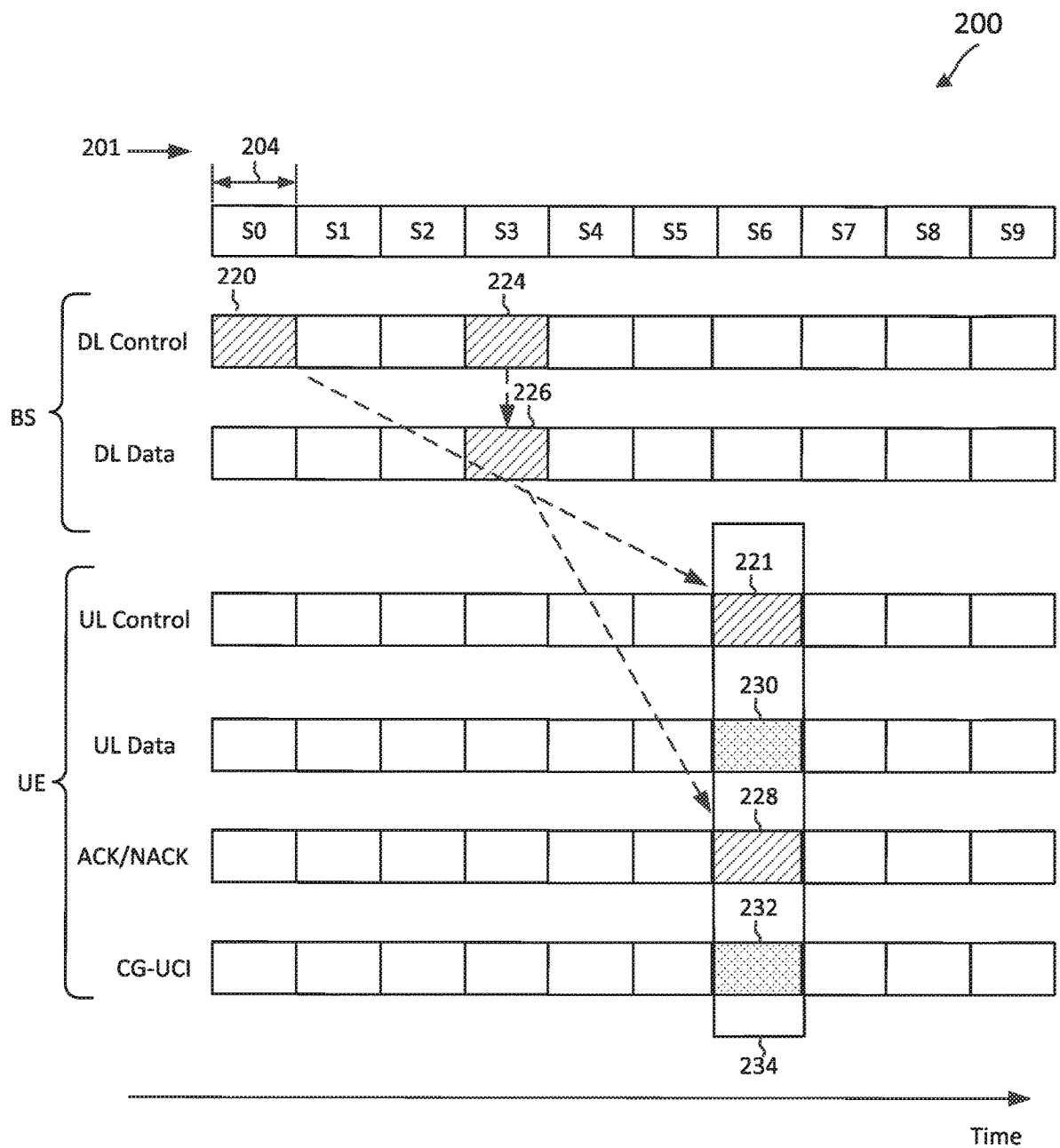
FIG. 2 illustrates a scheduling/configuration timeline according to one or more aspects of the present disclosure.

FIG. 2 illustrates a scheduling/configuration timeline 200 according to one or more aspects of the present disclosure. The scheduling/configuration timeline 200 may correspond to a scheduling/configuration timeline communicated between a BS 105 and a UE 115 of the network 100. In FIG. 2, the x-axis represents time in some constant units. FIG. 2 shows a frame structure 201 including a plurality of slots 204 in time. The slots 204 are indexed from S0 to S9. For example, a BS may communicate with a UE in units of slots 204. The slots 204 may also be referred to as transmission time intervals (TTIs). Each slot 204 or TTI carry a medium access control (MAC) layer transport block. Each slot 204 may include a number of symbols in time and a number of frequency tones in frequency. Each slot 204 may include a DL control portion followed by at least one of a subsequent DL data portion, UL data portion, and/or a UL control portion. In the context of LTE, the DL control portion, the DL data portion, the UL data portion, and the UL control portion may be referred to as a physical downlink control channel (PDCCH), a physical downlink shared channel (PDSCH), a physical uplink shared channel (PUSCH), and a physical uplink control channel (PUCCH), respectively.

The pattern-filled boxes represent transmissions of DL control information (DCI), DL data, UL control information (UCI), UL data, an ACK, and/or a NACK in corresponding slots 204. While an entire slot 204 is pattern-filled, a transmission may occur only in a corresponding portion of the slot 204. As shown, the BS transmits DCI 220 in the slot 204 indexed S0 (e.g., in a DL control portion of the slot 204). The DCI 220 may indicate a UL grant for the UE. The UE transmits UCI 221 to the BS in the slot 204 indexed S6 (e.g., in a UL control portion of the slot 204) based on the UL assignment. The slot 204 indexed S4 is a fourth slot from the slot 204 indexed S0. The UCI 221 is a scheduled UL, which is granted by a UL grant indicated in the DCI 220.

Further, the BS transmits DCI 224 in the slot 204 indexed S3 (e.g., in a DL control portion of the slot 204). The DCI 224 may indicate a DL grant for the UE in the same slot 204 indexed S3. Thus, the BS transmits a DL data signal 226 to the UE in the slot 204 indexed S3 (e.g., in a DL data portion of the slot 204). The UE may receive the DCI 224 and receive the DL data signal 226 based on the DL grant. The DL data signal 226 is a scheduled DL, which is granted by a DL grant indicated in the DCI 224.

After receiving the DL data signal 226, the UE 115 may report a reception status of the DL data signal 226 to the BS by transmitting an acknowledgement (ACK)/negative-acknowledgement (NACK) signal 228. The ACK/NACK signal 228 refers to a feedback signal carrying an ACK or a NACK. The feedback may be an acknowledgement (ACK) indicating that reception of the DL data by the UE is successful or may be a negative-acknowledgement (NACK) indicating that reception of the DL data by the UE is unsuccessful (e.g., including an error or failing an error correction). The UC may include CSI-part 1, CSI-part 2, and/or the ACK/NACK signal 228. For example, the ACK/NACK signal 228 may be part of the UCI.

The ACK/NACK signal 228 may be associated with a hybrid automatic repeat request (HARQ) process. In a HARQ process, a transmitting node may transmit various coded versions of information data to a receiving node. For example, the transmitting node may transmit a first coded version of information data to the receiving node. Upon receiving an NACK signal from the receiving node, the transmitting node may transmit a second coded version of the information data to the receiving node. The receiving node may combine the received first coded version and the received second coded version for error correction when both the received first coded version and the received second coded version are erroneous.

Transmission of data may be an autonomous (i.e., unscheduled) transmission or a scheduled transmission. As discussed above, the UE transmits the UCI 221 via a scheduled UL grant (e.g., transmission in PDCCH via DCI 220). Additionally, the UE receives the DL data signal 226 via a scheduled grant (e.g., transmission in PDCCH via DCI indicated in the DCI 224). A configured UL transmission is an unscheduled transmission, performed on the channel without a UL grant. A configured UL transmission may also be referred to as a grantless, grant-free, or autonomous transmission. In some examples, the UE may transmit a UL control information and/or UL data based on a configured grant. Additionally, configured-UL data may also be referred to as grantless UL data, grant-free UL data, unscheduled UL data, or autonomous UL (AUL) data. Additionally, a configured grant may also be referred to as a grant-free grant, unscheduled grant, or autonomous grant. The resources and other parameters used by the UE for a configured grant transmission may be provided by the BS in one or more of a RRC configuration or an activation DCI, without an explicit grant for each UE transmission.

To avoid collisions when communicating in a shared or an unlicensed spectrum, the UE may perform LBT to ensure that the shared channel is clear before transmitting a signal in the shared channel. In an example, if the channel is available (performance of the LBT results in a LBT pass), the UE may perform a UL transmission. If the channel is not available (performance of the LBT results in a LBT fail), the UE may back off and perform the LBT procedure again at a later point in time. Accordingly, based on the LBT, the UE may not be able to acquire a COT due to other nodes operating on the shared channel. The UE's ability to transmit on the UL transmission depends on whether the UE is able to gain access to the medium for transmission and/or reception of data. Rather than wait for a UL grant, the UE may desire to transmit a UL communication signal in a configured grant resource.

Additionally, to support more resource allocations in a network, transmissions may be scheduled based on a semi-persistent schedule (SPS). The BS may allocate one or more configured grant resources 234 in a frequency band (e.g., unlicensed frequency band or shared frequency band) for UL or DL transmission. In some examples, the configured grant resource 234 is based on a SPS. After a LBT results in a LBT pass, the BS may perform LBT and acquire a COT during which the BS transmits a SPS to a group of UEs. The BS may transmit to the UE, a configuration for a configured grant resource (e.g., configured grant resource 234). The BS may transmit the SPS, for example, via a RRC configuration message. The RRC configuration message may configure the UE with semi-persistent resources for AUL transmissions. In some examples, the UE-specific RRC signaling configures and/or reconfigures the location of the PUSCH for UCI transmission. The SPS includes a plurality of resource allocations spaced apart in time. The plurality of resource allocations may be spaced apart in time in accordance with a time interval of, for example, about 40 ms. In this example, the plurality of resources is allocated every 40 ms for each UE in the group of UEs. A resource may be shared with the group of UEs, and a UE may contend for the resource. The SPS may indicate scheduling information using relative timing (e.g., an offset time period relative to a current time period in which the scheduling information is communicated).

In some examples, the UE transmits a UL communication signal 230 in the configured grant resource 234, using a resource allocation specified in a SPS. The BS may receive the UL communication signal 230 in the configured grant resource 234. The UL communication signal 230 may include UL control information (UCI), a demodulation reference signal (DMRS), a phase-tracking reference signal (PTRS) (not shown), and UL data, which may also be referred to as configured-UL data. The UCI may include, for example, normal UCI and/or configured grant UCI (CG-UCI) 232. Although in FIG. 2, the ACK/NACK signal 228 and the CG-UCI 232 is shown as being separate from the UL communication signal 230, it should be understood that the ACK/NACK signal 228 and/or the CG-UCI 232 may be included in the UL communication signal 230.

The normal UCI may include a HARQ ACK/NACK signal, channel state information (CSI), and/or a scheduling request (SR). The HARQ ACK/NACK may also be referred to as a HARQ-ACK or an ACK/NACK (e.g., ACK/NAK signal 228). Additionally, the CSI may include a CSI-part 1 and a CSI-part 2. The CSI-part 1 can include information related to wideband channel quality indicator (CQI), sub-band differential CQI, and/or precoding matrix indicator (PMI), determined based on a reference signal (e.g., a CSI-RS) in a DL communication. The CSI-part 2 can include information related to CSI-RS resource indicator (CRI), rank indicator (RI), layer indicator (LI), determined based on a reference signal (e.g., a CSI-RS) in a DL communication. Each of the normal UCI (e.g. ACK/NACK, CSI-part1, CSI-part2) may be coded independently. The CG-UCI 232 is related to the configured grant and indicates information associated with the normal UCI (e.g., ACK/NACK, the CSI, and the SR) and/or the configured-UL data (e.g., UL data signal 222).

The DMRS may include pilot symbols distributed across the frequency channel to enable the UE or the BS to perform channel estimation and demodulation for the decoding. The pilot symbols may be generated from a predetermined sequence with a certain pattern, and the remaining symbols may carry UL data. The system can beamform the DMRS, keep it within a scheduled resource, and/or transmit the DMRS only when necessary in either a DL or a UL channel. For example, the DMRS allows a receiver to determine a channel estimate for the frequency channel, where the channel estimate may be used to recover the UL data. Additionally, the PTRS tracks phase of the Local Oscillator at the transmitter and the receiver and accordingly, minimizes the effect of the oscillator phase noise on system performance.

Figure 3A:
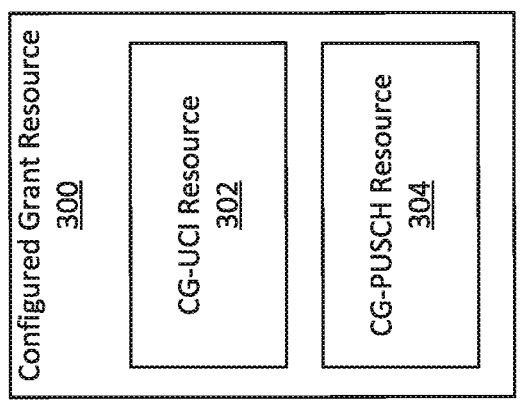
FIG. 3A illustrates a configured grant resource according to one or more aspects of the present disclosure.

FIG. 3A illustrates a configured grant resource 300 according to one or more aspects of the present disclosure. The configured grant resource 300 may be communicated between a BS 105 and a UE 115 of the network 100 and may correspond to the configured grant resource 234 in FIG. 2. The configured grant resource 300 includes a configured grant UCI (CG-UCI) resource 302 and a configured grant PUSCH (CG-PUSCH) resource 304. In some embodiments, as further illustrated in FIG. 3B, the CG-PUSCH 304 may include a series of repeated PUSCH instances to expand PUSCH coverage in time.

Referring to the discussion related to FIG. 2, the UE may transmit at least some parts of the normal UCI and the CG-UCI 232 in the CG-UCI resource 302 may transmit the configured-UL data in the CG-PUSCH resource 304. For example, the UE may transmit a UL communication signal including the CG-UCI 232 multiplexed with at least some parts of the normal UCI and the configured-UL data.

The configured grant resource may be referred to as a time-frequency resource. If the PUCCH transmission does not overlap in a time period with the configured grant resource 234, the UE may transmit the UCI 221 and the ACK/NACK 228 in the PUCCH. If the PUCCH transmission overlaps in a time period with the configured grant resource 234, however, the UE may determine whether to transmit a UL communication signal (e.g., CSI part 1, CSI part 2, ACK/NACK) in the PUCCH or the PUSCH and further determine the components to include in the UL communication signal. In FIG. 2, the PUCCH transmission overlaps in a time period with the configured grant resource 234.

As discussed, the UCI 221 may include three UCI parts (e.g., CSI-part 1, CSI-part 2, and ACK/NACK). With the CG-UCI 232, the number of UCI parts may be four. The UE may have difficulty multiplexing more than three UCI parts. Additionally, with more UCI parts, the total number of REs occupied by the UCIs may increase. Accordingly, if the number of UCI parts for transmission exceeds a first threshold (e.g., three parts) or the total number of REs occupied by the UCIs exceeds a second threshold, the UE may determine, based on a set of priority rules, which UCI part(s) to remove and/or which UCI part(s) to include in the UL transmission. The UE may determine, based on the set of priority rules, whether to transmit the UL communication signal 230 in PUCCH or in PUSCH.

In some aspects, the UE may determine that a PUCCH transmission in a time period overlaps with a configured grant resource. The UE may desire to transmit a CG-PUSCH and associated CG-UCI. The PUCCH transmission may include first UCI including a first number of parts based on a set of priority rules. The UE may determine whether to transmit only the first UCI in a PUCCH resource associated with the PUCCH transmission or to remove at least one part included in the first number of parts and transmit the remaining parts of the first UCI multiplexed with the CG-PUSCH and associated CG-UCI in the configured grant resource. The UE may transmit a UL communication signal in accordance with the determination of whether to transmit the first UCI in the PUCCH resource or to remove at least one part included in the first number of parts and transmit the remaining parts with the CG-PUSCH and associated CG-UCI in the configured grant resource.

Figure 3B:
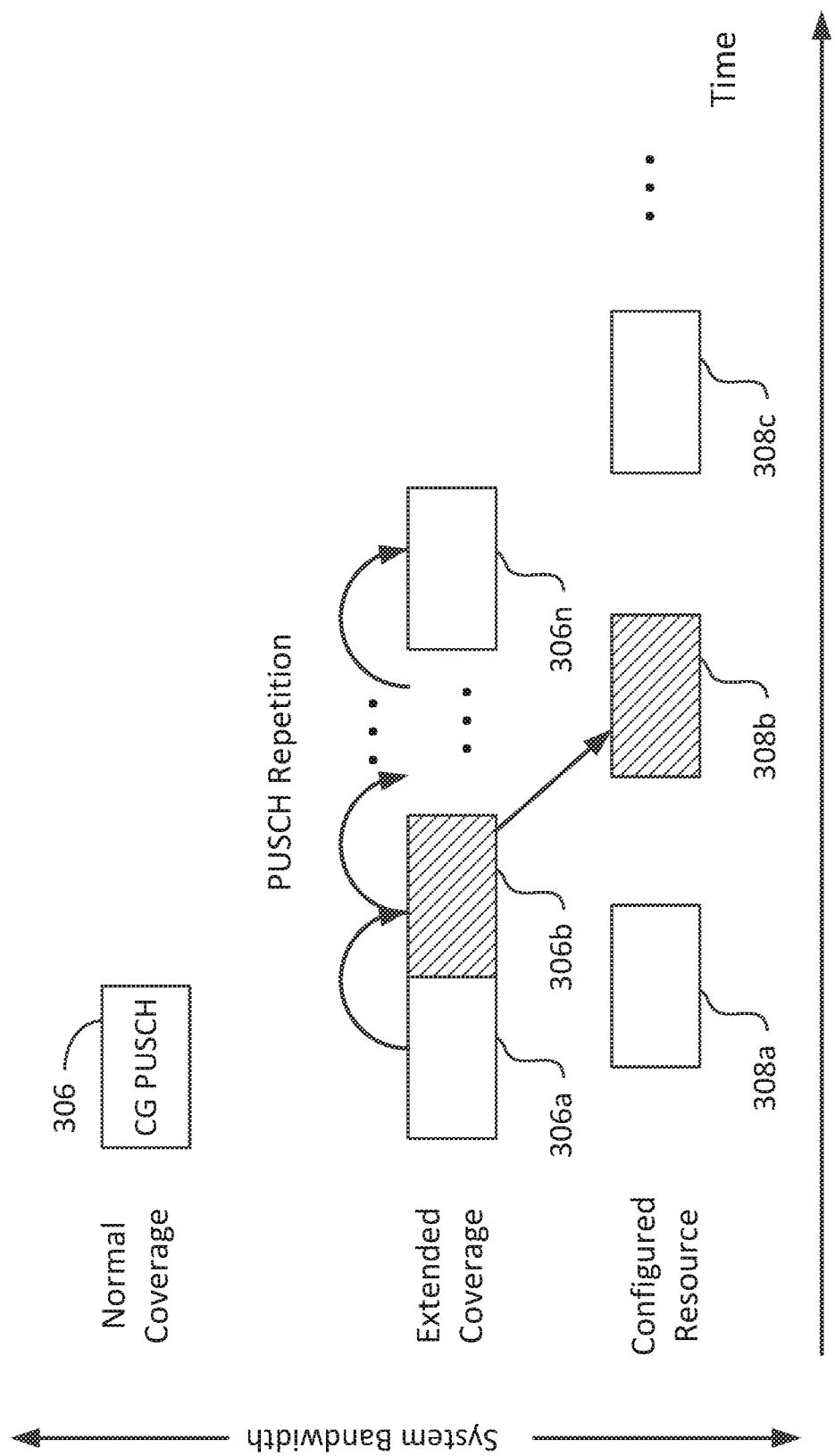
FIG. 3B illustrates a PUSCH repetition adaptation scheme in case of a discarded PUSCH repetition due to collision, according to one or more aspects of the present disclosure.

FIG. 3B illustrates a PUSCH repetition adaptation scheme in case of a discarded PUSCH repetition due to collision, according to one or more aspects of the present disclosure. As discussed in relation to FIGS. 2 and 3A, uplink data may be transmitted over CG-PUSCH resource instances configured by the system, which may be reflected in system information, RRC signaling, and/or the like transmitted to the BS. In one embodiment, the CG-PUSCH 306 may be assigned for normal coverage of PUSCH which carries uplink data.

In some embodiments, a series of repeated PUSCH instances 306a, 306b, . . . 306n may be used to extend coverage of PUSCH. For example, under the normal coverage, the CG-PUSCH 306 may be a time-frequency resource block, e.g., which covers 1 ms in time. Under the extended coverage, the PUSCH repetitions 306a-n may be a series of consecutive time-frequency resource blocks in time, which covers N ms in time.

In some embodiments, with extended coverage in time, the PUSCH repetitions 306a-n are more likely to collide with one or more downlink symbol transmissions, e.g., a PUSCH repetition 306b may collide with a time resource assigned to a downlink symbol, and the PUSCH repetition 306b may be dropped (as shown by the block 306b with shadow), causing performance loss in coverage.

In view of the performance loss issues caused by dropped PUSCH repetitions due to downlink symbol collisions, embodiments described herein provide a PUSCH repetition adaptation scheme that allows the usage of configured resources to retransmit uplink data that was supposed to be carried by the dropped PUSCH repetition. Specifically, in NR networks, some uplink data transmissions with configured grant may allow uplink transmission without dynamic grants (e.g., without DCI) on some configured occasion with configured resources and transmission parameters. Such configured resources may be used to compensate for the discarded PUSCH repetitions.

For example, such configured resources may include a series of periodic configured grants 308a, 308b, 308c, etc., for uplink transmissions, which may be assigned for every four time slots. When a PUSCH repetition 306b is discarded due to collision, based on the timing of PUSCH repetition 306b, the first uplink configured grant available after the dropping time, e.g., configured grant 308b, may be used to re-do the dropped PUSCH repetition 306b. In this case, uplink data that is supposed to be carried by the PUSCH repetition 306b may be retransmitted over the configured grant 308b.

Figure 4:
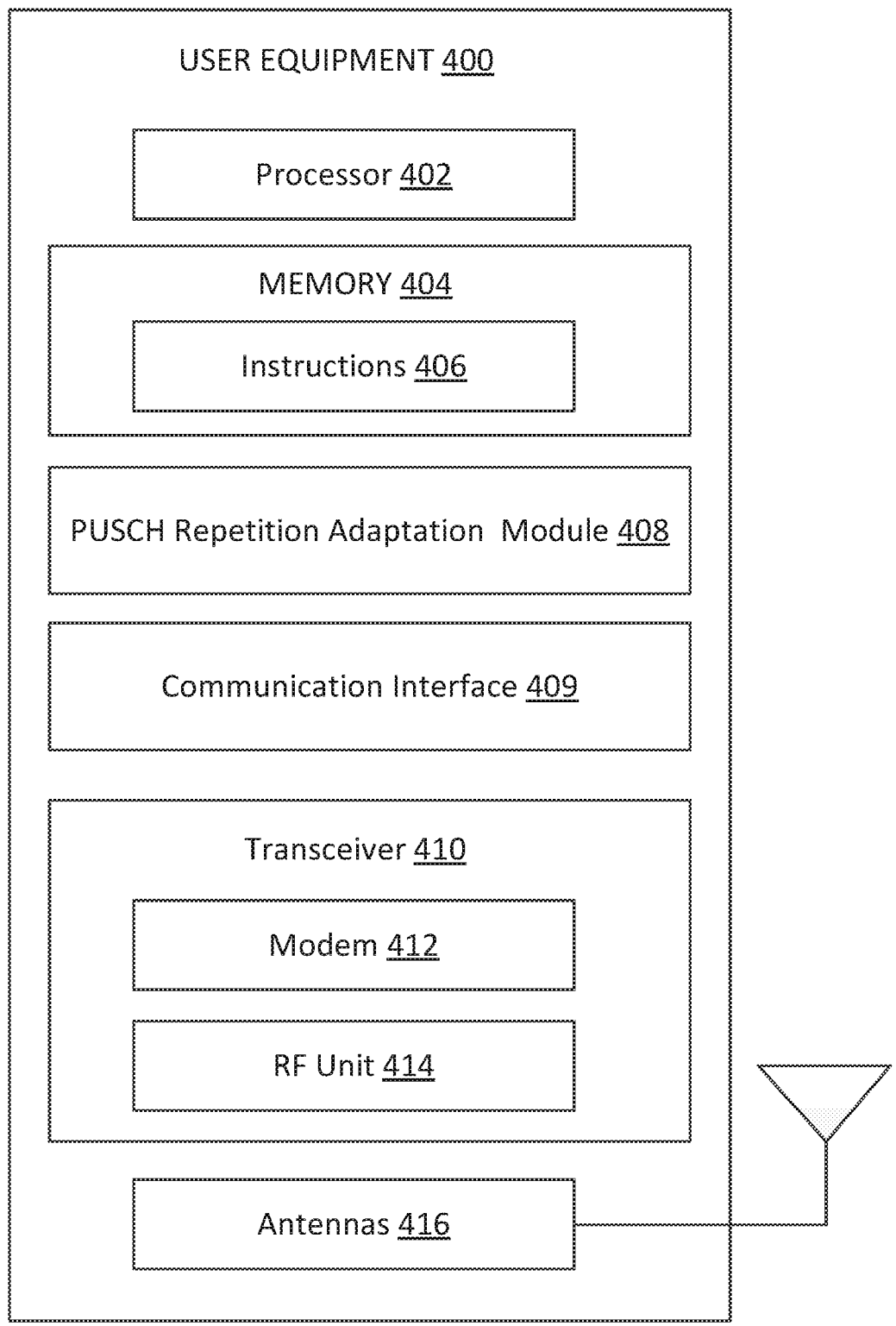
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1 or UE 202 shown in other figures, for example. As shown, the UE 400 may include a processor 402, a memory 404, a PUSCH repetition adaptation module 408, a communication interface 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 3A-3C and 6A-10. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The PUSCH repetition adaptation module 408 may communicate with the communication interface 409 to receive from or transmit messages to another device. Each of the PUSCH repetition adaptation module 408 and the communication interface 409 may be implemented via hardware, software, or combinations thereof. For example, each of the PUSCH repetition adaptation module 408 and the communication interface 409 may be implemented as a processor, circuit, and/or instructions 406 stored in the memory 404 and executed by the processor 402. In some examples, the PUSCH repetition adaptation module 408 and the communication interface 409 can be integrated within the modem subsystem 412. For example, the PUSCH repetition adaptation module 408 and the communication interface 409 can be implemented by a combination of software components (e.g., executed by a DSP or a general processor) and hardware components (e.g., logic gates and circuitry) within the modem subsystem 412. In some examples, a UE may include one of the PUSCH repetition adaptation module 408 and the communication interface 409. In other examples, a UE may include both the PUSCH repetition adaptation module 408 and the communication interface 409.

The PUSCH repetition adaptation module 408 and the communication interface 409 may be used for various aspects of the present disclosure, for example, aspects of FIGS. 3A-3B and 6-8. The PUSCH repetition adaptation module 408 is configured to receive from a BS (e.g., 105) configured grants (including CG-PUSCH, PUSCH repetitions, etc.) and/or dynamic grants. The PUSCH repetition adaptation module 408 is further configured to transmit uplink data over the configured grants and/or the dynamic grants to the BS. The PUSCH repetition adaptation module 408 is further configured to detect a collision between a PUSCH repetition and a downlink symbol, and subsequently discard a collided PUSCH repetition. The PUSCH repetition adaptation module 408 is further configured to determine an available preconfigured uplink resource, and then retransmit uplink data that was supposed to be transmitted over the discarded PUSCH repetition over the available preconfigured uplink resource.

The communication interface 409 is configured to coordinate with the PUSCH repetition adaptation module 408 to receive uplink or downlink scheduling grants from the BS, and/or communicate with the BS according to the uplink or downlink scheduling grants. The communication interface 409 is further configured to transmit uplink data to the BS.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the PUSCH repetition adaptation module 408, and/or the communication interface 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUCCH, PUSCH, channel reports, ACK/NACKs) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., DL data blocks, PDSCH, PUSCH, BWP hopping configurations and/or instructions) to the PUSCH repetition adaptation module 408 and/or communication interface 409 for processing. The antennas 416 may include multiple antennas of similar or different designs in order to sustain multiple transmission links. The RF unit 414 may configure the antennas 416.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
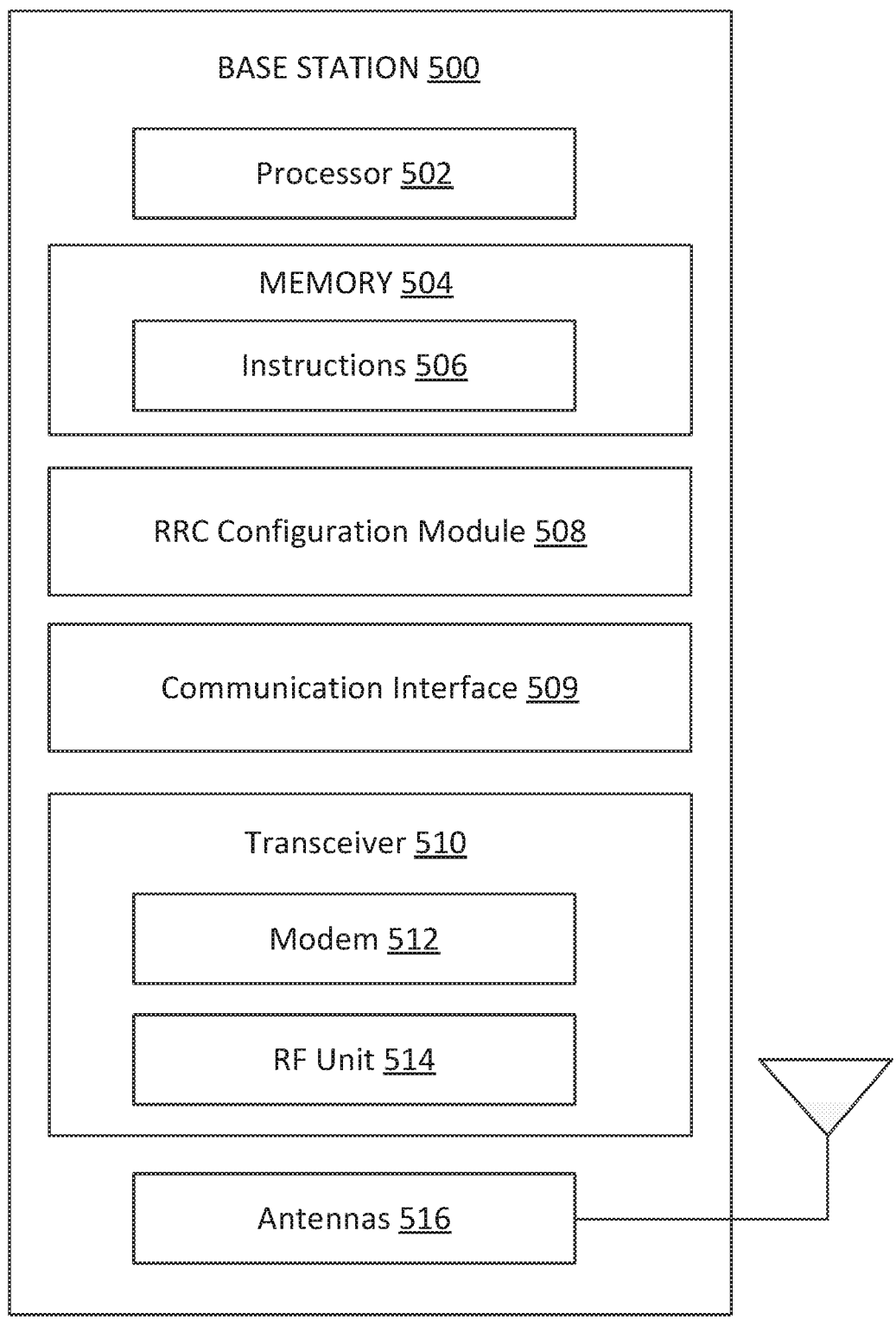
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 as discussed above in FIG. 1 and BS 204 described in other figures, for example. As shown, the BS 500 may include a processor 502, a memory 504, a RRC configuration module 508, a communication interface 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2-3 and 6-16, and 18. Instructions 506 may also be referred to as code, which may be interpreted broadly to include any type of computer-readable statement(s) as discussed above with respect to FIG. 4.

The RRC configuration module 508 may communicate with the communication interface 509 to receive from or transmit messages to another device. Each of the RRC configuration module 508 and the communication interface 509 may be implemented via hardware, software, or combinations thereof. For example, each of the RRC configuration module 508 and the communication interface 509 may be implemented as a processor, circuit, and/or instructions 506 stored in the memory 504 and executed by the processor 502. In some examples, the RRC configuration module 508 and the communication interface 509 can be integrated within the modem subsystem 512. For example, the RRC configuration module 508 and the communication interface 509 can be implemented by a combination of software components (e.g., executed by a DSP or a general processor) and hardware components (e.g., logic gates and circuitry) within the modem subsystem 512. In some examples, a UE may include one of the RRC configuration module 508 and the communication interface 509. In other examples, a UE may include both the RRC configuration module 508 and the communication interface 509.

The RRC configuration module 508 and the communication interface 509 may be used for various aspects of the present disclosure, for example, aspects of FIGS. 3A-3B and 6-8. The RRC configuration module 508 is configured to allocate and send uplink and/or downlink scheduling grants to UEs, e.g., via RRC configuration messages. For example, the RRC configuration module 508 may configure DCI information to indicate whether the option of retransmission of a PUSCH repetition on configured resources may be activated.

The communication interface 509 is configured to coordinate with the RRC configuration module 508 to transmit scheduling grants to the UE. The communication interface 509 is further configured to receive uplink data from the UE.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., BWP hoping configurations and instructions, PDCCH, PDSCH) from the modem subsystem 512 (on outbound transmissions) or of transmissions originating from another source such as a UE 115 and 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to aspects of the present disclosure. The antennas 516 may further receive data messages transmitted from other devices and provide the received data messages for processing and/or demodulation at the transceiver 510. The transceiver 510 may provide the demodulated and decoded data (e.g., channel reports, PUSCH, PUCCH, HARQ ACK/NACKs) to the RRC configuration module 508 and/or communication interface 509 for processing. The antennas 516 may include multiple antennas of similar or different designs in order to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
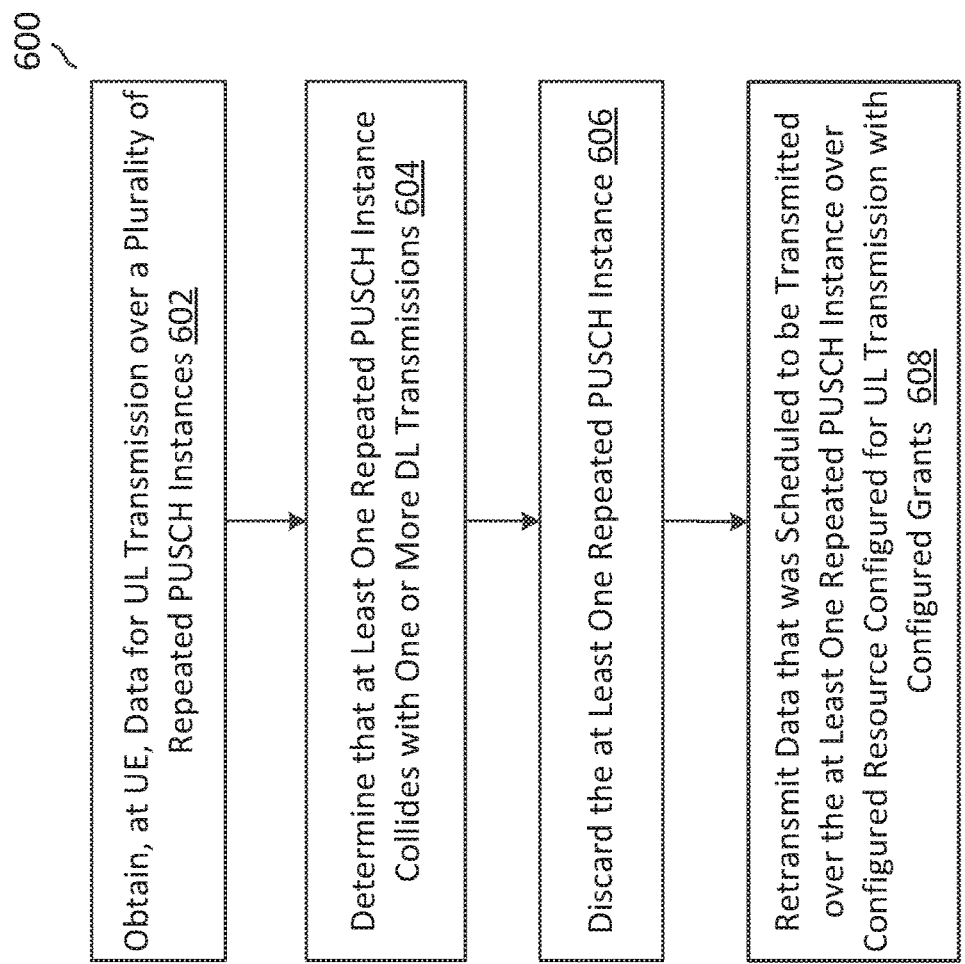
FIG. 6 illustrates a logic flow diagram performed by the UE corresponding to the PUSCH repetition adaptation scheme shown in FIG. 3B, according to aspects of the present disclosure.

FIG. 6 illustrates a logic flow diagram performed by the UE corresponding to the PUSCH repetition adaptation scheme shown in FIG. 3B, according to aspects of the present disclosure. Method 600 describes UE behavior for retransmitting PUSCH repetition (e.g., 306b in FIG. 3B) over configured resources (e.g., 308b in FIG. 3B) in response to dropping the PUSCH repetition due to collision with downlink symbols.

Steps of the method 600 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the PUSCH repetition adaptation module 408, the communication interface 409, the transceiver 410, the modem 412, and the one or more antennas 416, to execute the steps of method 600. The method 600 may employ in conjunction with the PUSCH repetition adaptation scheme described above with respect to FIG. 3B. As illustrated, the method 600 includes a number of enumerated steps, but aspects of the method 600 include additional steps before, after, and in between the enumerated steps. In some aspects, one or more of the enumerated steps may be omitted or performed in a different order.

At step 602, a UE may obtain data for uplink transmission over a plurality of repeated PUSCH instances. For example, the plurality of repeated PUSCH instances may be a series of consecutive configured grant PUSCH instances 306a-n shown in FIG. 3B.

At step 604, the UE may determine that at least one repeated PUSCH instance collides with one or more downlink symbol transmissions. For example, the UE may obtain from the slot format information the time-frequency resource allocated for the transmission of the one or more downlink symbols, and determine whether the time-frequency resource allocated for the downlink transmission overlap with any of the PUSCH repetitions 306a-n.

At step 606, the UE may discard the at least one repeated PUSCH instance, e.g., in response to determining that the at least one repeated PUSCH instance collides with one or more downlink symbol transmissions.

At step 608, the UE may retransmit data that was scheduled to be transmitted over the at least one repeated PUSCH instance, e.g., the discarded repeated PUSCH instance, over configured resource configured for uplink transmission with configured grants. For example, uplink data that was originally carried by CG-PUSCH 306b may be retransmitted over the next available configured resource 308b. The timing of the retransmission is further described in relation to FIG. 7.

Figure 7:
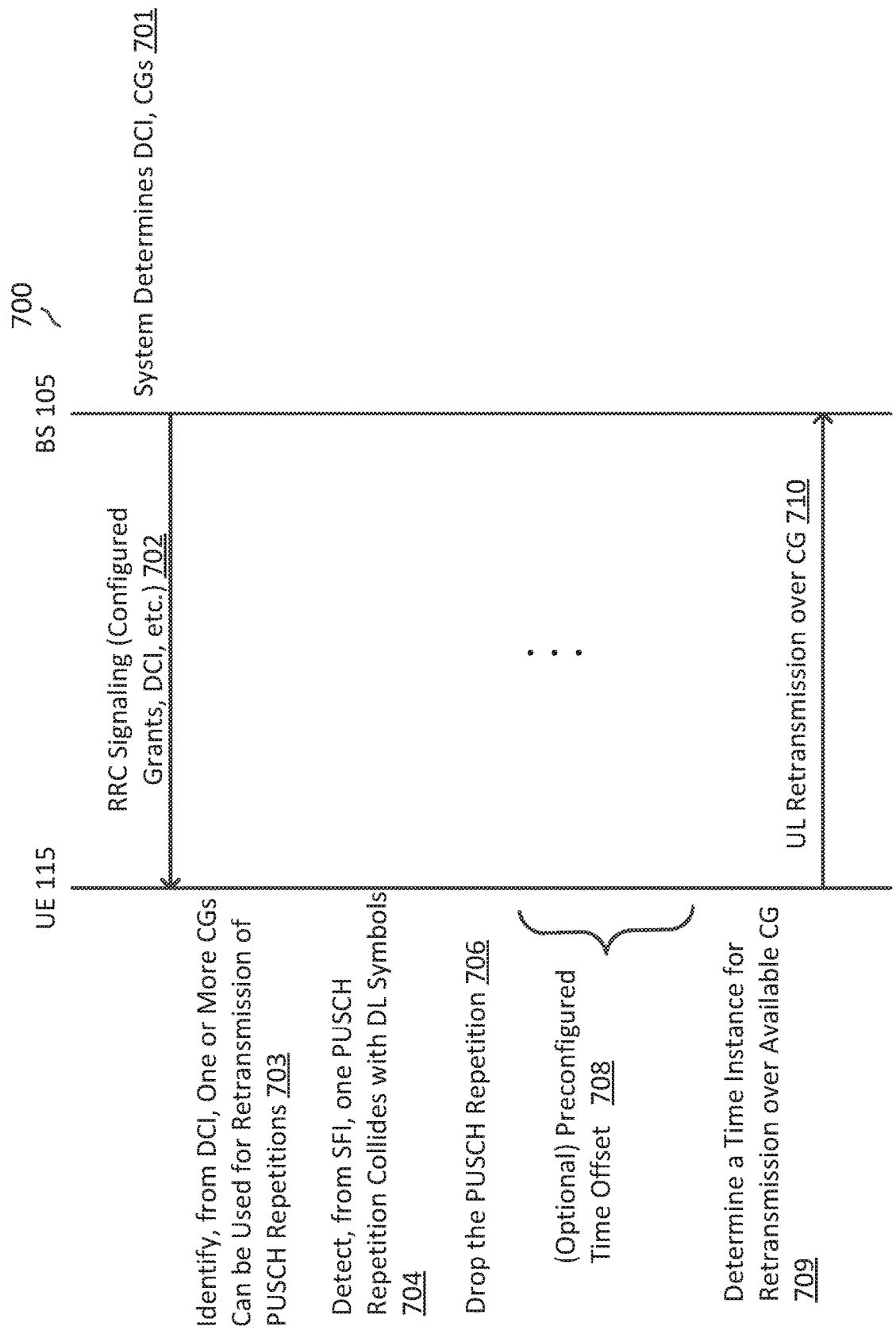
FIG. 7 illustrates a transmission timeline of the interactions between a UE and the BS for implementing the PUSCH repetition adaptation scheme shown in FIG. 6, according to aspects of the present disclosure.

FIG. 7 illustrates a transmission timeline of the interactions between a UE and the BS for implementing the PUSCH repetition adaptation scheme shown in FIG. 6, according to aspects of the present disclosure. Diagram 700 describes that method 600 in FIG. 6 may be realized by the interactive timeline between the UE 115 and BS 105.

For example, diagram 700 shows that BS 105 may determines the DCI, configured grants, etc. at 701 for time resource assignment to the UE 115. For example, the DCI may include scheduling information of PUSCHs, and an indication of an option of retransmission of a PUSCH repetition on configured resources. Such information may be transmitted from the BS 105 to UE 115 via RRC configuration messages via RRC signaling 702.

The UE 115 may in turn identify, from the received DCI, one or more preconfigured grants, that can be used for retransmission of PUSCH repetitions at 703. For example, a configured resource for every four time slots may be used for PUSCH repetition adaptation. If the UE 115 detects, from SFI, a PUSCH repetition collides with one or more downlink symbols at 704, the UE 115 may drop the PUSCH repetition 706.

In this case, the UE 115 may determine a retransmission time at 709 based on any combination of the timing of the dropped PUSCH repetition, the timing of the configured resources, and/or a preconfigured time offset. For example, the UE 115 may grab the next available configured resource (e.g., 308b in FIG. 3B) after the collided PUSCH repetition (e.g., 306b in FIG. 3B) has been dropped. For another example, the UE 115 may optionally want for a preconfigured time offset 708 upon the time when the collided PUSCH repetition is dropped, or upon the start time of the dropped PUSCH repetition, and then seek for the next available configured resource for retransmission.

In some embodiments, the determined retransmission time may be further subject to a time constraint, e.g., UE 115 may determine that whether the retransmission is valid depending on whether the retransmission time is within a deadline, to avoid a significant latency. The deadline may be determined based on the timing of the original PUSCH scheduling, the timing of the dropped PUSCH repetition and/or a preconfigured parameter. For example, the deadline may be the end time for the original PUSCH plus a preconfigured parameter, e.g., requiring that any retransmission be finished within certain latency upon the original PUSCH scheduling. For another example, the deadline may be the end time for the dropped PUSCH repetition plus a preconfigured parameter, e.g., requiring that any retransmission be finished within a latency after the dropping time of the discarded PUSCH repetition. In this way, the delay caused by PUSCH repetition adaptation via retransmission may be bounded.

The UE 115 may then conduct uplink retransmission over the determined preconfigured grant at 710 to compensate for the dropped PUSCH repetition. In some embodiments, the transmission may be conducted using the transmission parameters configured with the dropped PUSCH repetition, which override the transmission parameters of the preconfigured grant used for retransmission. In this way, the BS 105 may be able to combine the received uplink data transmitted over the preconfigured grant with data transmitted over other PUSCH repetitions.

Figure 8:
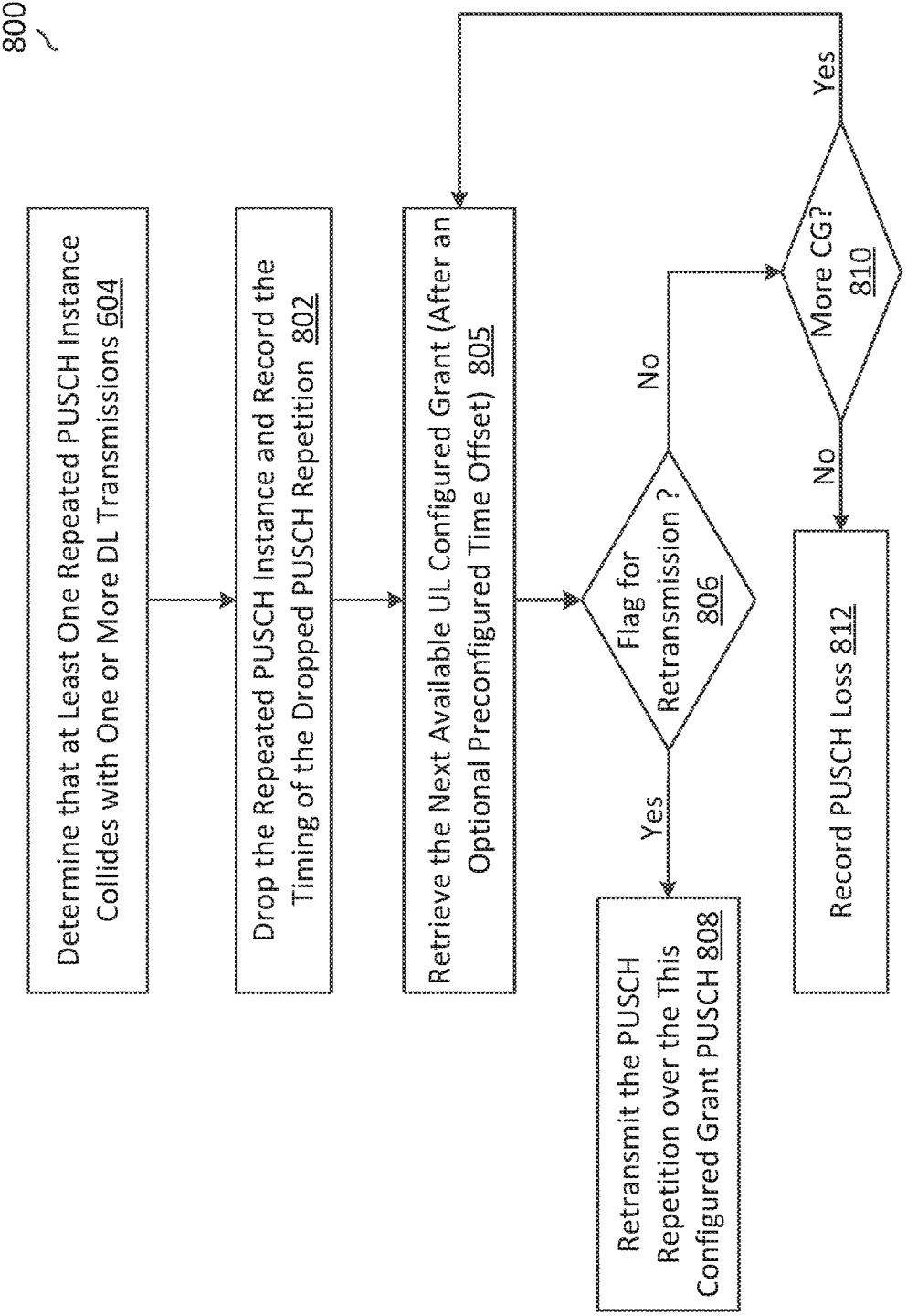
FIG. 8 illustrates a logic flow diagram performed by the UE corresponding to embodiments of determining configured resource for retransmission after a PUSCH repetition is discarded, according to aspects of the present disclosure.

FIG. 8 illustrates a logic flow diagram performed by the UE corresponding to embodiments of determining configured resource for retransmission after a PUSCH repetition is discarded, according to aspects of the present disclosure. Method 800 describes UE behavior for determining a configured grant for retransmission in response to a dropped PUSCH repetition when multiple uplink configured grants are available.

Steps of the method 800 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the PUSCH repetition adaptation module 408, the communication interface 409, the transceiver 410, the modem 412, and the one or more antennas 416, to execute the steps of method 600. The method 800 may employ in conjunction with the PUSCH repetition adaptation scheme described above with respect to FIG. 3B. As illustrated, the method 800 includes a number of enumerated steps, but aspects of the method 800 include additional steps before, after, and in between the enumerated steps. In some aspects, one or more of the enumerated steps may be omitted or performed in a different order.

Method 800 may proceed from step 604 in FIG. 6. At step 802, the UE may drop the repeated PUSCH instance and record the timing of the dropped PUSCH repetition. For example, the UE may record the original start and end time of the dropped PUSCH repetition, and/or the time when the PUSCH repetition is dropped.

At step 805, the UE may retrieve the next available uplink configured grant for retransmission, e.g., after an optional preconfigured time offset. For example, the UE may optionally want for the optional preconfigured time offset after the PUSCH repetition is dropped, and then set the retransmission timeline after the optional preconfigured time offset.

In some embodiments, the UE may identify multiple configured grant (CG) UL, the UE may determine the configured grant that is to be used for re-transmission of the dropped PUSCH, based on the scheduling DCI and/or the timing of the dropped repetition and/or some RRC configuration or a combination of them. For example, at step 806, the UE may check whether a flag is included in configuration of any of the available uplink configured grants, which may indicate that the respective uplink configured grant can be used for transmission of dropped PUSCH repetitions. If a flag is identified for the next available uplink configured grant, the UE may retransmit the PUSCH repetition over the particular configured grant at step 808.

If the next available uplink configured grant does not contain such a flag, the UE may optionally seek for more configured grants, e.g., the subsequent uplink configured grant to see whether a flag is indicated. For example, at step 810, if the UE determines there are more configured grants, method 800 may repeat at step 805. If no more configured grant is available, the UE may record a PUSCH repetition loss at step 812.

In some embodiments, referring to step 810, the UE may further determine whether the next available configured grant fits within a retransmission deadline as described above in relation to FIG. 7. The UE may only elect to retransmit data over preconfigured grants that start before the retransmission deadline to control the retransmission latency of uplink data.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication, comprising:
    obtaining, at a user equipment (UE), data for uplink transmission over a plurality of repeated physical uplink shared channel (PUSCH) instances;
    determining that at least one repeated PUSCH instance collides with one or more downlink symbol transmissions;
    discarding the at least one repeated PUSCH instance; and
    retransmitting data that was scheduled to be transmitted over the at least one repeated PUSCH instance over configured resource that was configured for uplink transmission with configured grants.

2. The method of claim 1, wherein the determining that at least one repeated PUSCH instance collides with one or more downlink symbol transmissions comprises:
    determining, from slot format information, that a first time resource assigned for the at least one repeated PUSCH instance overlaps with a second time resource assigned to the one or more downlink symbol transmissions.

3. The method of claim 1, further comprising:
    determining a time instance for retransmitting the data over the configured resource based on any combination of:
        a time when the at least one repeated PUSCH instance is discarded;
        a time resource that is defined for the configured resource; and
        a preconfigured time offset.

4. The method of claim 3, wherein the determining the time instance for retransmitting the data over the configured resource further comprises:
    identifying a next available configured resource after the preconfigured time offset has lapsed since the time when the at least one repeated PUSCH instance is discarded.

5. The method of claim 3, further comprising:
    determining whether the retransmission is valid depending on whether the determined time instance for retransmitting the data over the configured resource satisfies a time constraint based on any combination of:
    an original PUSCH scheduling;
    timing of the at least one repeated PUSCH instance that is discarded; and
    a preconfigured parameter.

6. The method of claim 5, wherein the retransmission is valid when the determined time instance is no later than an originally scheduled PUSCH time plus the preconfigured parameter, or the timing of the at least one repeated PUSCH instance that is discarded plus the preconfigured parameter.

7. The method of claim 1, wherein the data is retransmitted over the configured resource that was configured for uplink transmission with configured grants using transmission parameters associated with the at least one repeated PUSCH instance that override transmission parameters associated with the configured resource.

8. The method of claim 1, further comprising:
    receiving, from a base station (BS), downlink control information (DCI) via a radio resource control (RRC) configuration message,
        wherein the DCI indicates an option of retransmission of a PUSCH repetition over the configured resource.

9. The method of claim 1, further comprising:
    in response to determining that more than one uplink configured grants are available retransmitting data that was scheduled to be transmitted over the at least one repeated PUSCH instance:

determining a configured grant from the more than one uplink configured grants for the retransmission based on any combination of:
  scheduling DCI;
  timing of the at least one repeated PUSCH instance that is discarded; and
  RRC configurations.

10. The method of claim 9, wherein the configured grant contains a flag indicating an availability for retransmission of a discarded PUSCH repetition.

11. A user equipment (UE) of wireless communication, comprising:
  a memory configured to obtain data for uplink transmission over a plurality of repeated physical uplink shared channel (PUSCH) instances;
  a processor configured to:
    determine that at least one repeated PUSCH instance collides with one or more downlink symbol transmissions, and
    discard the at least one repeated PUSCH instance; and
  a transceiver configured to retransmit data that was scheduled to be transmitted over the at least one repeated PUSCH instance over configured resource that was configured for uplink transmission with configured grants.

12. The UE of claim 11, wherein the processor is further configured to determine that at least one repeated PUSCH instance collides with one or more downlink symbol transmissions by:
  determining, from slot format information, that a first time resource assigned for the at least one repeated PUSCH instance overlaps with a second time resource assigned to the one or more downlink symbol transmissions.

13. The UE of claim 11, wherein the processor is further configured to:
  determine a time instance for retransmitting the data over the configured resource based on any combination of:
    a time when the at least one repeated PUSCH instance is discarded;
    a time resource that is defined for the configured resource; and
    a preconfigured time offset.

14. The UE of claim 13, wherein the processor is further configured to determine the time instance for retransmitting the data over the configured resource by:
  identifying a next available configured resource after the preconfigured time offset has lapsed since the time when the at least one repeated PUSCH instance is discarded.

15. The UE of claim 13, wherein the processor is further configured to:
  determine whether the retransmission is valid depending on whether the determined time instance for retransmitting the data over the configured resource satisfies a time constraint based on any combination of:
    an original PUSCH scheduling;
    timing of the at least one repeated PUSCH instance that is discarded; and
    a preconfigured parameter.

16. The UE of claim 15, wherein the retransmission is valid when the determined time instance is no later than an originally scheduled PUSCH time plus the preconfigured parameter, or the timing of the at least one repeated PUSCH instance that is discarded plus the preconfigured parameter.

17. The UE of claim 11, wherein the data is retransmitted over the configured resource that was configured for uplink transmission with configured grants using transmission parameters associated with the at least one repeated PUSCH instance that override transmission parameters associated with the configured resource.

18. The UE of claim 11, wherein the transceiver is further configured to:
  receive, from a base station (BS), downlink control information (DCI) via a radio resource control (RRC) configuration message,
    wherein the DCI indicates an option of retransmission of a PUSCH repetition over the configured resource.

19. The UE of claim 11, wherein the processor is further configured to:
  in response to determining that more than one uplink configured grants are available retransmitting data that was scheduled to be transmitted over the at least one repeated PUSCH instance:
    determine a configured grant from the more than one uplink configured grants for the retransmission based on any combination of:
      scheduling DCI;
      timing of the at least one repeated PUSCH instance that is discarded; and
      RRC configurations.

20. The UE of claim 19, wherein the configured grant contains a flag indicating an availability for retransmission of a discarded PUSCH repetition.

21. A non-transitory processor-readable storage medium storing processor-executable instructions for wireless communication, the instructions executable by a processor to perform operations comprising:
  obtaining, at a user equipment (UE), data for uplink transmission over a plurality of repeated physical uplink shared channel (PUSCH) instances;
  determining that at least one repeated PUSCH instance collides with one or more downlink symbol transmissions;
  discarding the at least one repeated PUSCH instance; and
  retransmitting data that was scheduled to be transmitted over the at least one repeated PUSCH instance over configured resource that was configured for uplink transmission with configured grants.

22. The non-transitory processor-readable storage medium of claim 21, wherein the operation of determining that at least one repeated PUSCH instance collides with one or more downlink symbol transmissions further comprises:
  determining, from slot format information, that a first time resource assigned for the at least one repeated PUSCH instance overlaps with a second time resource assigned to the one or more downlink symbol transmissions.

23. The non-transitory processor-readable storage medium of claim 21, wherein the operations further comprise:
  determining a time instance for retransmitting the data over the configured resource based on any combination of:
    a time when the at least one repeated PUSCH instance is discarded;
    a time resource that is defined for the configured resource; and
    a preconfigured time offset.

24. The non-transitory processor-readable storage medium of claim 23, wherein the operation of determining the time instance for retransmitting the data over the configured resource further comprises:

identifying a next available configured resource after the preconfigured time offset has lapsed since the time when the at least one repeated PUSCH instance is discarded.

25. The non-transitory processor-readable storage medium of claim 23, wherein the operations further comprise:
determining whether the retransmission is valid depending on whether the determined time instance for retransmitting the data over the configured resource satisfies a time constraint based on any combination of:
an original PUSCH scheduling;
timing of the at least one repeated PUSCH instance that is discarded; and
a preconfigured parameter.

26. The non-transitory processor-readable storage medium of claim 25, wherein the retransmission is valid when the determined time instance is no later than an originally scheduled PUSCH time plus the preconfigured parameter, or the timing of the at least one repeated PUSCH instance that is discarded plus the preconfigured parameter.

27. The non-transitory processor-readable storage medium of claim 21, wherein the data is retransmitted over the configured resource that was configured for uplink transmission with configured grants using transmission parameters associated with the at least one repeated PUSCH instance that override transmission parameters associated with the configured resource.

28. The non-transitory processor-readable storage medium of claim 21, wherein the operations further comprise:
receiving, from a base station (BS), downlink control information (DCI) via a radio resource control (RRC) configuration message,
wherein the DCI indicates an option of retransmission of a PUSCH repetition over the configured resource.

29. The non-transitory processor-readable storage medium of claim 21, wherein the operations further comprise:
in response to determining that more than one uplink configured grants are available retransmitting data that was scheduled to be transmitted over the at least one repeated PUSCH instance:
determining a configured grant from the more than one uplink configured grants for the retransmission based on any combination of:
scheduling DCI;
timing of the at least one repeated PUSCH instance that is discarded; and
RRC configurations,
wherein the configured grant contains a flag indicating an availability for retransmission of a discarded PUSCH repetition.

30. A system of wireless communication, comprising:
means for obtaining, at a user equipment (UE), data for uplink transmission over a plurality of repeated physical uplink shared channel (PUSCH) instances;
means for determining that at least one repeated PUSCH instance collides with one or more downlink symbol transmissions;
means for discarding the at least one repeated PUSCH instance; and
means for retransmitting data that was scheduled to be transmitted over the at least one repeated PUSCH instance over configured resource that was configured for uplink transmission with configured grants.

* * * * *